W. NEVINS.
Cultivator.
No. 37,005.
Patented Nov. 25, 1862.
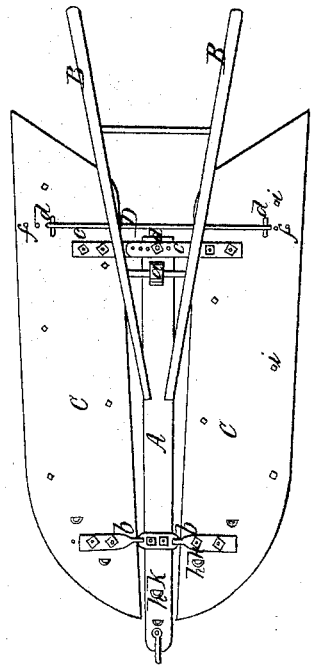
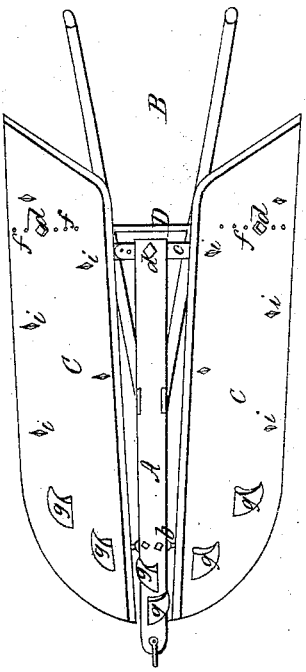
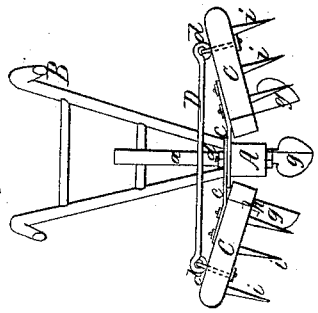
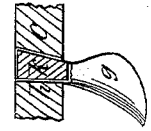
Witnesses:
R. F. Osgood.
Hamuet Etheridge
Inventor:
William Nevins
By J. Fraser Heo.
Attys

UNITED STATES PATENT OFFICE.

WILLIAM NEVINS, OF IRVING, NEW YORK.

IMPROVEMENT IN CULTIVATORS.

Specification forming part of Letters Patent No. 37,005, dated November 25, 1862.

*To all whom it may concern:*

Be it known that I, WILLIAM NEVINS, of Irving, in the county of Chautauqua and State of New York, have invented a new and useful Improvement in Cultivators; and I do hereby declare that the following is a full and exact description thereof, reference being had to the accompanying drawings, making part of this specification.

Figure 1 is a plan of my improved cultivator; Fig. 2, a similar view thereof turned bottom upward; Fig. 3, a rear elevation of the same; Fig. 4, a fragment of one of the wings, showing the manner of securing the mold or share teeth in place.

Like letters designate corresponding parts in all the figures.

In cultivating between the rows of young plants it is desirable not only to stir and pulverize the ground and exterminate the weeds, but also to turn the soil gently from the center to the outside, so as to leave a hollow in the middle, and to deposit it suitably around the plants.

It is the object of my improvement to accomplish this; and the invention consists essentially in the combination and arrangement of two rigid jointed wings capable of any desirable angular adjustment with a central beam.

As represented in the drawings, an ordinary straight central beam, A, is employed, to the rear of which is secured a standard, $a$, by which the handles B B are connected to the implement.

On the opposite sides of the beam are respectively situated wings C C, forming either single pieces, as represented, or frames, if more desirable. These wings are of suitable size to contain the teeth necessary for cultivating, and they are jointed to the beam in front by suitable hinges, $b\,b$, and connected in the rear by means of overlapping bars $c\,c$, secured thereto, provided with adjusting-holes, through any of which passes a bolt, $d$, securing them to the beam, and thus allowing their lateral expansion to adapt them to different widths of cultivating, in the usual manner. The wings thus connected with the beam are adapted to stand at any upward angle thereto by being connected together by some suitable means allowing adjustment. Any arrangement that will accomplish this purpose may be used; but I prefer that represented in the drawings, being a stiff brace-rod, D, in the rear, extending from one side to the other, and having eyes at the opposite ends, jointing respectively with eye-bolts $d\,d$ passing through any of a set of transverse adjusting-holes, $f\,f\,f$, in the wings, and secured at the under side by means of nuts. The same result might be produced by making the brace-rod in halves, with the inner ends overlapping and secured together by a bolt; or the brace-rod might extend from each wing upward to a bolt or pin adjustable vertically in the standard $a$. I do not confine myself to the exact arrangement shown; but any equivalent one that will produce the same result may be employed.

In the front end of the beam I secure either two mold or share teeth, $g\,g$, Fig. 2, or a single double mold-tooth for turning the earth outward from the center in both directions; and in the forward end of each wing I secure two similar smaller teeth, turning outward, as represented. In the rear of these, and occupying the remainder of the wings, I secure ordinary plain straight harrow-teeth, $i\,i$. I prefer to make the mold-teeth of sheet metal, in which case they are cut to a pattern and rolled or bent into proper shape.

The shank $h$ is made semicircular, or nearly so, in cross-section, Fig. 1, and stands inclined slightly, and when fitted in its socket in the wood a key or wedge, $k$, is driven down into the concave behind, thus holding it firmly and secure in place, as represented most clearly in the section, Fig. 4. Thus arranged the angle of the wings to the beam is as indicated in Fig. 3, and this angle may be varied at pleasure to give greater or less acuteness by changing the eyebolts $d\,d$ to any of the adjusting-holes $f\,f$. In this rigid angular condition the implement is perfectly adapted to turning the soil from the center to the outside around the plants, which it does in the gentlest manner and without injury to the stalks, thus forming a hollow in the center between the rows for the water to settle in. The front mold-teeth enter deeply into the earth, turning the soil outward, which, striking the harrow-teeth, is fully pulverized, the weeds being clearly separated from the soil and deposited on top.

If desirable or necessary at any time, a gage-wheel for regulating the depth of cut may be used, either in the front or rear.

What I claim as my invention, and desire to secure by Letters Patent, is—

The rigid angular wings C C, connected with the beam A, and made adjustable by means of the brace-bar D, eyebolts $d\ d$, and adjusting-holes $f\ f$, or their equivalent device, the whole arranged, combined, and operating substantially as and for the purposes herein set forth.

In testimony whereof I have hereunto signed my name in the presence of two subscribing witnesses.

WM. NEVINS.

Witnesses:
NATHANIEL STONE,
JOHN S. HERRINGTON.